United States Patent Office 3,839,385
Patented Oct. 1, 1974

3,839,385
ORGANO-SILICON MODIFIED SILICA GEL PARTICLES
Francois Meiller, Palaiseau, and Michel Deleuil, Antony, France, assignors to Rhone-Progil, Paris, France
No Drawing. Filed Apr. 25, 1972, Ser. No. 247,371
Claims priority, application France, Apr. 29, 1971, 7115321
Int. Cl. C07f 7/08, 7/12
U.S. Cl. 260—448.2 B                    7 Claims

ABSTRACT OF THE DISCLOSURE

Particles of silica gel, the surface characteristics of which are modified by grafting with an organic group having a silicon atom at one end and a halogen at another.

Such organic groups include organo silanes having the formula

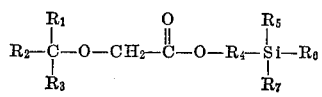

wherein $R_1$, $R_2$ and $R_3$ are $CX_3$ or $X$, $X$ being halogen and at least one $X$ being fluorine, $R_4$ is alkylene, $R_5$, $R_6$ and $R_7$ are halogen or alkyl, with at least one of $R_5$, $R_6$ and $R_7$ being halogen. Other such organic groups include copolymers of a vinyl trialkoxy silane and a compound of the formula

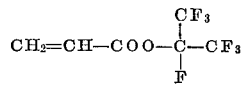

---

This invention relates to bodies of silica gel, the surface properties of which are modified by grafting of an organic chain having a silicon atom at one end and a halogen group at the other.

It is known that bodies of silica gel, in the form of balls, crushed or agglomerated fragments obtained by compression or extrusion, may have their surface characteristics modified whereby the surface properties of the silica gel bodies extend the uses that can be made and/or enhance the use that is being made of such silica gel bodies, particularly in adsorption, catalysis and chromatography.

Such diversified properties can be obtained by the evolution of the silica gel which, when freshly prepared generally from alkaline silicates and acids, has a specific surface exceeding approximately 100 m.²/gram, depending somewhat upon the pH during the reaction. This evolution depends on the most frequently combined influences of such physical factors as temperature, pressure and time, and chemical factors such as the media in which the gel is treated or the chemical ingredients present in the gel.

It will be apparent that the number of parameters present permits wide diversity in treatments to which the silica gel may be subjected. The fact that the gel, subjected to evolution, was formed initially in aqueous medium, brings about the presence of residual silanol functions in widely varying amounts, depending primarily on the thermal conditions of the evolution.

These residual silanol functions, because of their hydroxyl groups, play an important part in the results to be expected from the use of the silica gel in adsorption, chromatography, or catalysis, due to the reactivity of these hydroxyls in relation to many chemical compounds brought into contact with the gel.

Moreover, it is well known that it is generally possible to cause the hydroxyl groups present in the surface of different compounds or bodies, especially the hydroxyl groups present on the surface of the silica bodies or silica gel bodies, to react with numerous chemical carbon and silica compounds capable of removal or replacement of the hydrogen atom from the hydroxyl group and to become fixed onto the surface by means of oxygen linkages between the hydroxyls and the silicon or carbon atoms of the chemical compounds, groups of atoms or radicals which may be complex.

The linking or binding of groups, by way of silicon atoms of various organo silanes, has been recommended since it permits siliceous bodies to be obtained with surface properties particularly adapted for use in chromatography techniques, the binding being substantially irreversible by reason of its resistance to heat and hydrolysis.

It is an object of this invention to produce and to provide a method for producing silica gel bodies of extended use and which find advantageous use in adsorption, chromatography, and catalysis.

All siliceous bodies and bodies of silica gel may be treated in accordance with the practice of this invention but it is preferred to select bodies for treatment having the desired porosity and surface characteristics most suitable for the grouping to be grafted thereon and the chemical compounds to be treated therewith. It is evident that the specificity of the surface properties of siliceous bodies or silica gel bodies so modified, especially in chromatography techniques, depend on the characteristics of the various atoms and the various radicals embodied in the grafted groupings.

Because of their nature, which is frequently highly organic, it will be noted that the grafted groups generally give the modified siliceous bodies or silica gel bodies a certain amount of sensitivity to heat, but not to the extent of limiting the contemplated application. In fact, notwithstanding the highly organic nature, application of the bodies with modified surface properties are frequently possible at temperatures of several hundred degrees. As previously indicated, the bond with the silicon atom does not impose any practical limitation.

It has been found that the silica gel bodies, suitable for various chromatographic applications, the porous characteristics of which have a mean value ranging from a few to several thousand Angstroms, can be grafted with organic groups which originate from siliceous compounds formed of organic chains comprising radicals or monovalent organic atoms selected from the group formed of $CX_3^-$ and $X^-$, in which X is a halide, at least one of which is preferably fluoride, and in which at least one radical or atom bound to the silicon atom is capable of reacting with a residual hydroxyl group on the body of silica gel to effect an Si—O—Si linkage to confer specific surface properties onto the silica gel bodies most suitable for chromatographic application.

Particularly suitable for use are the compounds having the general formula

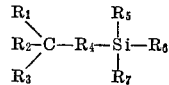

in which $R_1$, $R_2$ and $R_3$ are monovalent radicals or atoms selected from the group consisting of $CX_3^-$ and $X^-$, in which X is a halide, preferably one of which is a fluoride, $R_4$ is an organic chain having at least 3 carbon atoms and in which at least one of the radicals or atoms $R_5$, $R_6$ and $R_7$ is capable of reacting with a residual hydroxyl group of the silica gel body.

Use can also be made of other polymerized silanes, resulting from the reaction of a vinyl silane containing at least one radical capable of reacting with residual hydroxyls of the silica gel bodies with a vinyl derivative containing monovalent radicals or atoms selected from the group $CX_3^-$ and $X^-$, in which X is a halide, preferably fluoride.

Among the different silica gel bodies capable of being treated in accordance with the practice of this invention, a particularly appropriate silica gel body is one in which the evolution of porosity has been obtained thermally in the presence of foreign atoms, such as alkaline metals capable of producing acid functions, or hydrothermally in the presence of ammonia. Such methods have been described by the applicants in the French Patents Nos. 1,473,240; 1,482,867; 1,528,785, and in the French patent application filed June 4, 1970 and entitled "Large Pore Silica Gel Bodies," yielding bodies of highly diversified porous shape and characteristics, the distribution of the dimensions of the pores being more or less defined, depending somewhat on the treatments to which the initial gel is subjected.

It goes without saying that, generally speaking, other reactions of hydrolysis of the silicon compounds should be avoided during the grafting on the porous silica gel bodies with such groupings, since water is easily adsorbed by these bodies. Similarly, the silica gel bodies to be treated should preferably be carefully dried. Once the grafting has been achieved by vapor phase or liquid phase contact with these silica gel bodies over a period of time which may last several hours, with the silicon compound being dissolved in a suitable solvent, the product is washed with one of the same solvents followed by drying which, in turn, may be followed by thermal extraction with the aid of one of the solvents over several hours. The latter treatment is for the purpose of eliminating fractions of these silicon compounds merely adsorbed and not chemically grafted by way of the oxygen atoms of the hydroxyl groups.

It has been discovered that, among the different applications of the silica gel bodies treated in accordance with the practice of this invention, the chromatographic applications, relating to the separation of non-polar components and more specifically the separation of halogenated organic derivatives, are of particular interest.

Similarly, for the purpose of illustration, several comparative examples are hereinafter provided with relation to the chromatographic separations with silica gel bodies of the present invention, as compared with silica gel bodies on which other molecular structures are grafted, as well as with untreated silica gel bodies.

Other applications of silica gel bodies modified according to the present invention, as well as their applications in adsorption and catalysis, result from the same changes of surface properties and may frequently be provided and interpreted by the chromatographic techniques of separation and detection.

EXAMPLE 1

The silica gel bodies used in this example are microballs obtained by coagulation of drops of silica sol in a liquid immiscible with water. These microballs are then washed and heat treated. The microballs have a diameter ranging from 100 to 200 microns, a specific surface of 240 m.$^2$/g., a porous volume of 0.84 cm.$^3$/g., with the average diameter of the pores being 115 A. 40 grams of the microballs are predried for five hours at 150° C. under a current of dry nitrogen in order to eliminate adsorbed water, then they are contacted for four hours at reflux to 100° C. with a solution of 20 grams of silane dissolved in 100 cm.$^3$ toluene, the silane having the formula

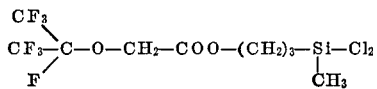

The microballs are subsequently washed with toluene, filtered, then steam and oven dried for one hour at 110° C.

The prepared sample is used to fill a stainless steel chromatographic column which is 2 meters long and about 3.2 mm. in diameter. The carrier gas used is nitrogen fed at a rate of 2 liters per hour.

The prepared column is tested for the separation of the 0.2 μl. of a mixture containing 35% by weight dichloroethane-1,2, 30% by weight trichloroethane-1,1,1, and 35% carbon tetrachloride. For the purpose of comparison, the same quantity of the same mixture was also separated on an identical column filled with the same quantity of the same pre-dried microballs, but without the treatment by the silane solution in toluene. The temperature conditions differ for the two tests, but are selected for optimum conditions for the particular filler. For the test with the microballs treated with the silane, the test was carried out under isothermal conditions at 70° C. For the untreated microballs, the test was carried out under isothermal conditions at 130° C. The pic recordings, obtained by detection by flame ionization, show considerable differences. The retention times are much greater for the untreated microballs than for the treated microballs, though the operation is carried out at a much higher temperature. The 1,2 dichloroethane particularly is washed out in 9 minutes on the treated microball column and in 13 minutes on the untreated microball column which was at the 60° C. higher temperature. Finally, it is noted that the treated microballs furnish much more symmetrical pics and the untreated microballs decompose the trichloroethane pic, showing that the treatment of the microballs avoids a harmful, probably catalytic action of the untreated microballs. The absence of action assures consistency in the time of the separating properties of the treated microballs. In summary, this test shows the actual change of the surface properties of the microballs obtained by their treatment with silane and the advantages resulting therefrom.

EXAMPLE 2

This example relates to the separation of the ingredients of a mixture of dichloromethane, carbon tetrachloride, trichloromethane, trichloroethane-1,1,1 trichloroethylene, benzene and dichloroethane-1,2 on silica gel microballs of 100 to 200 microns in diameter, with a specific surface of 65 m.$^2$/g., a pore diameter of 350 A. and a pore volume of 0.9 cm.$^3$/g., with the microballs being treated in the manner described in the preceding example, with the same silane. The chromatographic column used is the same as the one described in the preceding example, the nitrogen flow being 1.5 l./hour, the operation being isothermal at 70° C. The recording obtained with the same detector, as in the preceding example, shows that in spite of the greater complexity of the mixture, with the silica gel having a smaller specific surface, separation of materials with such neighboring properties are obtained, because of the pics, corresponding to the joint components of both mixtures, are of the same order as in the recording of the preceding example.

EXAMPLE 3

This example is concerned with the separation of a complex mixture of halo alkanes and alkanes on treated microballs prepared in the same manner as described in the preceding example in an identical column. The nitrogen flow is 1.5 l./hour and the isothermal operation is at 60° C. The mixture comprises ethane, propane, isobutane, butane, difluorochlorobromoethane, tetrafluorodichloroethane, fluorotrichloromethane, and trifluorotrichloroethane. The pics are detected as indicated in the preceding examples. Despite the high complexity of the mixture, the recorded pics are well separated and symmetrical, while the recording of the separation of the components of a mixture of the same kind, on untreated microballs, shows highly asymetrical pics and takes about twice as long.

EXAMPLE 4

This example relates to the separation of a complex mixture of halo alkanes and alkanes on silica microballs of 240 m.²/g. specific surface, identical with those used in Example 1 and treated generally in a manner analogous to that described in Example 1, but with a complex silane obtained by copolymerization of vinyltriethoxy silane having the formula

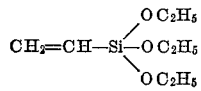

with heptafluoroisopropyl acrylate having the formula

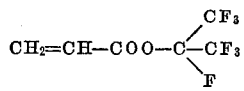

Both these materials produce polymers which are most frequently formed with two fluorinated motifs for each silicated motif.

The column used is the same as in the preceding examples. The nitrogen flow is 1.8 l./hour and the isothermal operation is at 60° C.

In this complex mixture, there are combined, more specifically, in addition to different alkanes and fluorohalogenated derivatives thereof, difluorochlorobromomethane, tetrafluorodichloroethane, difluorobromoethane, fluorotrichloromethane and difluorodibromomethane, the separation of which is important to the industry of fluorinated alkane derivatives. Good and rapid separation is obtained with the different compounds discharging in less than 4 minutes. The two pics of tetrafluorodichloroethane and difluorobromomethane are perfectly distinct, even though they are very close to each other.

EXAMPLE 5

This example relates to tests on silica gel bodies which are not prepared in accordance with the practice of this invention. It is intended to show that the reaction on silica gel bodies of silanes, other than those previously defined, does not endow them with favorable characteristics. Two silica gel microball samples of 240 m.²/g., the same as previously used, are treated under the same general conditions, but with chloromethylmethyldichloro silane or with n-octylmethyldichloro silane. The microball samples so obtained are tested under the same chromatographic columns as previously used, under isothermal conditions at 65° C. for the first, and 55° C. for the second silane, in the particularly difficult separation of difluorochlorobromomethane and tetrafluorodichloroethane which form part of a complex mixture. The separation was carried out correctly by microballs treated as in Examples 3 and 4. In the present example, with microballs treated by the first silane stripped on the organic chain, the pics are asymmetrical and only an essential separation is detected. With the microballs treated with the second silane, the pics are generally more symmetrical but the selectivity is very weak, because no separation of the two cited components is detected.

EXAMPLE 6

This example relates to silica gel microballs having 428 m.²/g. specific surface, 100 to 200 microns average diameter, 70 A. porous diameter and 1 cm./g. pore volume, and treated with the same silane as in Example 1. They are used in a column 4 meters long and about 32 mm. in diameter, in isothermal operation at 100° C., to separate a mixture composed of difluorodichloromethane, tetrafluorodichloroethane and fluorotrichloromethane, the detection being obtained as in the preceding examples. An efficacious separation with very substantially symmetrical pics is obtained.

This example shows the possibility of using, in chromatography, silica gel bodies of large specific surface when treated in accordance with the present invention, which, if untreated, would introduce considerable catalytic action.

All of the foregoing examples relate to silica gel bodies in the form of microballs. It will be understood that use can be made of other silica gel bodies such as originate from gel fragmentation, when treated in the same manner with silanes of the type described, and that such bodies treated in accordance with the practice of this invention may be used in the same types of applications.

It will be understood that changes may be made in the details of formulation and operation without departing from the spirit of the invention, especially as defined in the following claims.

We claim:
1. Bodies of silica gel grafted with organic groups to modify the surface properties thereof in which the grafted group originates from an organo silane selected from the group consisting of an organo silane having the formula

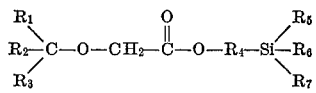

wherein $R_1$, $R_2$ and $R_3$ are monovalent groups selected from the group consisting of $CX_3$ and X wherein X is halogen and at least one X is fluorine, $R_4$ is alkylene, and $R_5$, $R_6$ and $R_7$ are groups attached directly to the silicon atom, and are selected from the group consisting of halogen and alkyl, with at least one of the $R_5$, $R_6$ and $R_7$ groups being halogen; and a copolymer of a vinyl trialkoxy silane and a compound of the formula

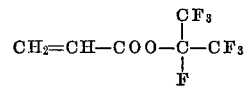

2. Bodies of silica gel as claimed in Claim 1 which contain alkali metal atoms and a porosity modified by heat evolution prior to the grafting reaction.

3. Bodies of silica gel is claimed in Claim 1 in which the porosity of the bodies, prior to grafting reaction, has been modified hydrothermally in the presence of ammonia.

4. Bodies of silica gel as claimed in Claim 1 in which the bodies are of ball shape.

5. Bodies of silica gel as claimed in Claim 1 in which the bodies are in fragment form.

6. Bodies of silica gel grafted with organic groups to modify the surface properties thereof in which the grafted group originates from an organo silane having the general formula

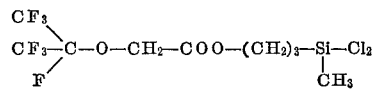

7. Bodies of silica gel grafted with organic groups to modify the surface properties thereof in which the grafted group originates from a silane prepared by the copolymerization of vinyltriethoxy silane with heptafluoroisopropyl acrylate having the formula

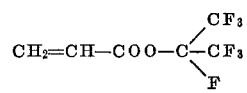

References Cited
UNITED STATES PATENTS

| | | | |
|---|---|---|---|
| 3,664,967 | 5/1972 | Stehl | 252—426 X |
| 3,207,699 | 9/1965 | Harding et al. | 260—448.2 B X |
| 3,213,156 | 10/1965 | Harding et al. | 252—426 X |
| 3,346,349 | 10/1967 | Harding et al. | 260—448.2 R X |

PATRICK P. GARVIN, Primary Examiner

U.S. Cl. X.R.

252—426, 430